United States Patent [19]  
Vaughan

[11] Patent Number: 4,684,453  
[45] Date of Patent: Aug. 4, 1987

[54] PURIFICATION OF DYE BATHS

[76] Inventor: Daniel J. Vaughan, 36 Paxon Dr., Wilmington, Del. 19803

[21] Appl. No.: 819,931

[22] Filed: Jan. 21, 1986

Related U.S. Application Data

[63] Continuation-in-part of Ser. No. 665,052, Oct. 26, 1984, which is a continuation-in-part of Ser. No. 568,897, Jan. 6, 1984, abandoned.

[51] Int. Cl.$^4$ .................... B01D 57/02; C23C 22/86; C09B 67/54
[52] U.S. Cl. .................... 204/182.4; 204/182.3; 204/131; 8/440; 148/6.1
[58] Field of Search .................... 204/182.3, 182.4, 96, 204/131; 148/6.1; 8/522, 440

[56] References Cited

U.S. PATENT DOCUMENTS

| | | | |
|---|---|---|---|
| 2,921,005 | 1/1960 | Bodamer | 204/182.4 X |
| 3,357,823 | 5/1964 | Tuwiner | 204/182.4 X |
| 3,411,998 | 11/1968 | Wallman et al. | 204/182.4 X |
| 4,000,069 | 12/1976 | Fusco | 8/440 X |
| 4,092,105 | 5/1978 | Sullins | 8/440 X |

FOREIGN PATENT DOCUMENTS 372018 5/1962 Japan .................... 204/182.4

Primary Examiner—John F. Niebling  
Assistant Examiner—John S. Starsiak, Jr.  
Attorney, Agent, or Firm—Charles J. Tonkin

[57] ABSTRACT

An electrolytic purification process useful for contaminated solutions of oxygen-sensitive organic dyes and other such sensitive organic materials and metal chelates and complexes of organic materials involves applying an electrical potential to said solutions in an intermediate or feed compartment separated by cation permeable membranes from an anolyte compartment having an anode and an acidic aqueous anolyte and from a catholyte compartment having a cathode and an aqueous catholyte whereby the impressed electrical current causes metal cations to be electrotransported through the cation permeable membrane into the catholyte and the solution of oxygen- or hydrogen-sensitive organic material is purified without exposure to the anode or oxygen formed at the anode or to the cathode or hydrogen formed in the catholyte compartment.

A special embodiment comprises treating solutions of oxygen- or hydrogen-sensitive organic materials first with a salt of a multivalent metal cation to insolubilize such organic materials, separating the insolubilized organic material from unwanted substances such as large volumes of water found in dilute solutions of the desired organic material or other substances encountered in the solutions, dissolving the separated insolubilized organic material in an acidic aqueous solution and removing the multivalent metal cations by electrotransport thereof through a cation permeable membrane into a catholyte as described in the above described electrolytic purification process.

6 Claims, No Drawings

PURIFICATION OF DYE BATHS

This application is a continuation-in-part of U.S. Ser. No. 665,052, filed Oct. 26, 1984 which in turn is a continuation-in-part of U.S. Ser. No. 568,897, filed Jan. 6, 1984, now abandoned.

FIELD OF THE INVENTION

This invention relates to an electrolytic process for removal of metal cations from an aqueous solution comprising oxygen-sensitive organic material. More specifically this invention relates to a membrane electrolytic process for purification and restoration of dye baths used to color anodized aluminum that contain an organic dye and aluminum or other metal cations without destroying the organic dye.

BACKGROUND OF THE INVENTION

Colored anodized aluminum is used in a wide variety of applications ranging from novelties and giftware through automotive trim to building and architectural components. Many organic dyes can be used to color anodized aluminum. The principal dyes are mordants of premetallized azo and anthraquinone type dyes having sulfonic, carboxylic, hydroxyl, amino, nitro, nitroso, and other substituents such as premetallized chromium chelate or a complex of a black mordant azo dye having the general formula 2-amino-4 nitrophenol→4,6,7-Trihydroxy-2-napthalene sulfonic acid.

The process of dyeing the aluminum oxide film of anodized aluminum comprises immersion of the anodized aluminum in an aqueous dye bath having about 1 wt % organic dye at 150° F. for about ten minutes. The colored aluminum is then sealed to prevent dyeing and staining. In theory, with only makeup of the dye used for coloring, the dye bath should last indefinitely, In practice, however, the dye bath becomes contaminated with aluminum and other metal cations which increase the time required for dyeing and cause precipitates to be formed in the dye bath that result in off-quality product. The loss in production capacity, the high cost of the dyes and cost for disposal of the spent dyes dictate the need for a method to purify and restore the dye bath that provides consistent dyeing and maximum use of the dyes. Heretofore there has been no method for purification and restoration of the dye baths without some oxidation of the organic dye.

Electrodialysis is a well known art (see U.S. Pat. Nos. 4,325,792; 4,439,293; 3,896,013 and 3,964,985 the disclosures of which are hereby incorporated by reference). Electrodialysis is the transport of ions through ion permeable membranes as a result of an electrical driving force. The process is commonly carried out in an electrolytic cell having an anolyte compartment containing an anode and anolyte and a catholyte compartment containing a cathode and catholyte with the anolyte and catholyte compartments being separated by ion permeable membranes. An electric current is passed between the anode and cathode of the cell through the aqueous anolyte and catholyte solutions. The electric current causes, for example, the cations present in the anolyte to migrate through a cation permeable membrane into the catholyte. When the electrical potential, i.e., cell voltage, is sufficient to electrolyze water, oxygen is formed at the anode. My U.S. Pat. Nos. 4,325,792 and 4,439,293 teach electrotransport of multivalent cations through cation permeable membranes into aqueous solutions containing agents that insolubilize the multivalent cations.

SUMMARY OF THE INVENTION

The present invention provides an electrolytic process for purification and restoration of organic dye baths used to color anodized aluminum and removal of cations from other aqueous solutions containing oxygen-sensitive materials without damaging the organic dye or other like sensitive materials. The process comprises an electrochemical cell having an anolyte compartment with an anode and aqueous anolyte, a feed compartment containing the organic acid dye bath or other aqueous solution of an anodic oxygen sensitive material, and a catholyte compartment with a cathode and aqueous catholyte with the compartments separated by cation permeable membranes whereby when an electrical potential is applied aluminum and other cations are electrotransported from the dye bath into the catholyte and the organic dye is separated during the electrolysis from the anolyte to prevent oxidation of the dye and from the catholyte to prevent reduction of the dye. The process is especially useful for restoration of organic acid dye baths used to color anodized aluminum by providing consistent dyeing with maximum use of the dye.

A special application of the present process resides in recovering dyes from rinse waters by first treating the rinse water containing the dye with a salt of a multivalent metal cation to insolubilize the dye, filtering, or otherwise concentrating or collecting the insolubilized dye, for separation from the large volume of rinse water, then dissolving the insolubilized or precipitated dye in an aqueous acidic solution such as an acidic dye bath solution which is thereafter treated in accordance with the primary process to purify electrolytically the dye. This technique is also beneficial in the manufacture of dyes wherein unwanted materials are found in aqueous solutions containing the desired dye.

DETAILED DESCRIPTION OF THE INVENTION

A membrane electrolytic process is provided whereby metal cations can be removed from an aqueous solution comprising an organic material that is oxygen-sensitive without damaging the organic material. The aqueous solution comprising the organic material and metal cations is fed to a feed compartment of an electrolytic cell with said feed compartment being separated by cation permeable membranes from an anolyte compartment containing an aqueous anolyte and anode and a catholyte compartment containing an aqueous catholyte and a cathode. When an electrical potential is applied across the cell the metal cations are electrotransported from the feed through a cation permeable membrane into the catholyte while preventing oxidation of the organic material. The electrolytic process of this invention is especially useful for restoration of organic dye baths used to color anodized aluminum that contain aluminum and other metal cations.

The feed to the feed compartment of the electrolytic cell of the process of this invention is any aqueous solution comprising metal cations and an anodic oxygen-sensitive material that would be oxidized by oxygen formed at the anode of the electrolytic cell. Preferably the aqueous solution in the feed compartment has a pH of three or less to promote ionic mobility of any multivalent metal cations present in the aqueous solution.

The anolyte in the electrolytic process of this invention is an aqueous solution of an acid with or without soluble salts. Preferably, the anolyte is an aqueous solution of an acid without soluble salts. This anolyte is acidic, i.e., has a pH no greater than seven, preferably no greater than three.

The catholyte of the process of this invention is an aqueous solution of an acid or an aqueous solution comprising a soluble salt or an aqueous solution comprising an agent that insolubilizes or ionically immobilizes multivalent cations. Preferably the catholyte is an aqueous solution of (a) a salt of an acid which acid in a one normal solution has a pH no greater than three and forms a water soluble salt with the multivalent cations present in the feed and (b) agents (in sufficient concentration), such as, hydroxyl, carbonate and bicarbonate ions that insolubilize and ionically immobilize multivalent cations. My copending application U.S. Ser. No. 665,052, filed Oct. 26, 1984 (of which this application is a continuation-in-part) is incorporated by reference and discloses and claims the process of electrodialytically converting salts of multivalent cations by electrotransport of multivalent cations in aqueous solution through a cation permeable membrane into aqueous solutions containing both agents that insolubilize the multivalent metal cations and a soluble salt of an acid, which acid in a one normal solution would have a pH no greater than three, the salt addition improving the electrotransport and minimizing fouling of the membrane.

Although it is preferable that the multivalent cation electrotransported from the dye bath in the intermediate or feed compartment through the membrane into the catholyte be precipitated in the basic catholyte, it is possible to use an acidic catholyte. Acidic catholyte is useful especially when the multivalent metal cations are aluminum, calcium, magnesium and other metal cations that do not readily electroplate on the cathodes.

The membranes in the electrolytic process of this invention are cation permeable membranes. The preferred membranes are hydrocarbon and halocarbon membranes that are substantially chemically stable to the process conditions and mechanically and chemically suitable for design and economical operation of the electrolytic process. These are membranes of hydrocarbon and halocarbon polymers containing acids and acid derivatives. Particularly suitable acid polymers are perhalocarbon polymers containing pendant sulfonic, sulfonamide or carboxylic acid groups. The perfluorocarbon membranes, such as Nafion ®, a perfluorocarbon polymer containing sulfonic acid groups, are preferred for a corrosive and strong oxidizing environment. The same or different membranes can be used to separate the feed from the anolyte and catholyte.

The electrolytic cell of the process of this invention has a feed compartment with an aqueous solution comprising salts of metal cations and a material such as a dye that is oxygen-sensitive with said feed compartment separated by cation permeable membranes from an anolyte compartment having an anode and aqueous anolyte and a cathode compartment having a cathode and aqueous catholyte. Preferably, the feed is an organic dye which is non-ionic or contains anionic groups.

The dyes to be purified, or recovered from rinse water and purified, are generally oxygen- or hydrogen-sensitive organic dyes, usually mordants of the premetallized azo or anthraquinone types or organic metal complexes or chelates such as the acid dyes having sulfonic, carboxylic, hydroxyl, amino, nitro, nitroso and/or other substituents such as a premetallized chromium chelate or complex of a mordant azo dye. Such acid dyes can be applied to textiles, print, and anodized aluminum, magnesium or other metals. Suitable dyes are illustrated by those used as colorants for the anodized metals and include the organic dyes that form substantially water insoluble salts with multivalent metal cations. Typical dyes are black mordant azo dye having the general formula: 2-amino-4 nitrophenol→4,6,7-Trihydroxy-2-naphththalene sulfonic acid, blue mordant azo dye having the general formula: 2-amino-5 nitro-p-cresol→chromatropic acid, and the commercial dyes of Sandoz, Inc., as Deep Black MLW-C.I. Mordant Black 75, Fiery Red ML-C.I. Mordant Red 84, Blue LLW-C.I. Mordant Blue 69, Green C.L.W.-C.I. Mordant Green 50 and Black CL-C.I. Mordant Black 76. (The "C.I." designation is from the C.I. application classification as described in Kirk-Othmer's "Encyclopedia of Chemical Technology" 3rd Edition, 1984. Vol. 8, p. 160 and 169, published by Wiley). Other oxygen-sensitive acid dyes that form substantially-water insoluble products upon reaction with multivalent metal cations are illustrated, for example, in Kirk-Othmer (referenced above) in Vol. 8, pp. 162–168.

The catholyte is usually circulated through the catholyte compartment and the precipitated or ionically immobilized multivalent cation compounds recovered from the effluent such as by settling, filtration, or other convenient means. Likewise anolyte as well as the feed material can be fed to the anolyte compartment and the intermediate or feed compartment, respectively, and effluents taken to recover the products including the purified dye from the intermediate compartment. As will be apparent to one skilled in the art, flow rates will be selected to allow sufficient time for electrolysis consistent with recovery of reaction products.

The process of this invention is suitable for recovery and purification of dyes containing acid groups or organic metal complexes or chelates such as mordants of azo or anthraquinone type dyes. The process is especially applicable for purifying dyes that comprise metal chelates or metal complexes. Metal ions can be removed by the present process from aqueous solutions comprising metal chelates or metal complexes without oxidation or reduction of the metal in the metal complex or metal chelate. This is accomplished by isolating the dye in the intermediate compartment separated from the cathode and hydrogen formed at the cathode and from the anode and oxygen at the anode.

The instant process is useful in the manufacture of dyes wherein the dyes become contaminated with unwanted materials which are usually metal compounds. Dye purification and separation of extraneous materials is obtained by converting the dyes to insolubilized salts. The process is beneficial for purifying dyes of metal chelates or metal complexes without oxidation or reduction of the metal complex or chelate. Thus, the instant process includes the manufacture of dyes comprising separation and recovery of dyes from aqueous solutions by forming water insoluble salts thereof followed by electrodialytic conversion of such dye salts to water soluble dyes.

The following examples illustrate the practice of the instant invention. They are presented solely for the purpose of illustrating the invention and are not in any way to be construed as limiting the scope of the invention.

An electrolytic cell was assembled having a feed compartment separated by cation permeable membranes from an anolyte compartment containing a TlR-2000 iridium based anode from Electrode Corporation and an aqueous anolyte and a catholyte compartment containing a titanium mesh cathode on an aqueous catholyte. The electrolysis area of the cell was two square feet with 0.75 inch spacing between electrodes. The cation permeable membranes were Nafion ® perfluorinated membrane 427 from DuPont. Electrical power was supplied by a 0-20 volt and 0-150 amp rectifier from Rapid Electric Co. The cell was equipped for circulating the feed solution from a tank through the cell feed compartment and back to the feed tank. The anolyte and catholyte solutions were circulated through the respective cell compartments.

The restoration and purification of the dyebath feeds were determined by immersing into the dye bath (adjusted to the temperature, concentration and pH as recommended by the supplier) a standard coupon sample of aluminum that was anodized in 230 g/liter of sulfuric acid at 20° C. for 30 minutes with 1.5 amps/sq. decimeter current at 15 volts applied potential. The freshly anodized sample was rinsed in water and immersed in the dye bath at 60° C. at the concentration and pH as noted. The immersion times required to obtain a desired color were determined for the spent dyebath, and the spent dye bath at two levels of restoration. The immersion times were compared to the immersion time and color of a new dye bath comprising the same dye, concentration of dye, pH and temperature. The pH of the spent dye bath feed to the cell initially and as the dyebath was restored was determined. A decrease in pH indicates the removal of cations from the feed into the catholyte and formation of the acid of the salt anion in the dye bath feed. The spent dye bath samples were obtained from companies that anodize and color aluminum.

EXAMPLE 1

A 50 gallon sample of a spent dye bath containing 10 grams/liter of Sandoz Deep Black MLW dye having a pH of 4.5 and an immersion time of over 15 minutes and unacceptable color was fed to the feed compartment of the electrolytic cell. The anolyte was a 0.3 wt % aqueous solution of sulfuric acid. The catholyte was a 3 wt % solution of sodium chloride with hydroxyl ions formed at the cathode. An electrical potential of 9.5 volts was applied across the cell. After two days of electrolysis the pH of the dye bath feed was 2.1 and the catholyte contained hydroxide precipitates of aluminum, calcium, copper, and iron. After six days of electrolysis the pH of the dye bath feed to the cell was 1.3 and cell operation was terminated. The immersion time for a sample of the dye bath feed after two days of electrolysis that was adjusted to a pH of 4.5 with sodium hydroxide was 10-12 minutes with acceptable color. The immersion time for the dye bath feed after six days, pH of 4.5, was 8-10 minutes. The immersion time for a new dye bath (10 g/l dye and pH of 4.5) was 8-10 minutes. These results show restoration of the spent dye bath.

EXAMPLE 2

A fifty gallon sample of a spent dye bath containing 2.0 grams/liter of Sandoz Gold dye having an immersion time of over 15 minutes at a pH of 5.5 and unacceptable color was fed to the feed compartment of the electrolytic cell. The pH of the dye bath was reduced from 5.5 to 3.0 by the addition of acetic acid. The anolyte and catholyte solutions were aqueous solutions comprising 0.3 wt % sulfuric acid. An electrical potential of 12 volts was applied across the cell. After two days of electrolysis the pH of the dye bath feed was 1.3 and after four days 1.2. On neutralization with sodium hydroxide the catholyte solution contained hydroxide precipitates of aluminum, copper, calcium and iron. The immersion times for the dye bath feed, after two and four days of electrolysis, adjusted to a pH of 5.5 with sodium hydroxide were 8 to 10 minutes with acceptable color. The immersion time for a new dye bath of 2.0 grams/liter, pH of 5.5 of Sandoz Gold dye was 8 to 10 minutes.

EXAMPLE 3

A 50 gallon sample of the spent dye bath of Example 1, containing 10 grams/liter of Sandoz Deep Black MLW dye was fed to the anolyte compartment of the electrolytic cell. An aqueous solution comprising 25 wt % sodium chloride adjusted to a pH of 12 with sodium hydroxide was fed to the "feed" compartment of the cell and a 3 wt % aqueous solution of sodium sulfate was fed to the catholyte solution of the cell. An electrical potential of 7.5 volts was applied across the cell. After one day of electrolysis, the "feed" compartment of the cell contained precipitates of aluminum, calcium, iron and copper. The blue-black color of the dye bath solutions had changed to a purple-violet color, and after three days of operation the dye bath solution was essentially a red-purple color indicating oxidation of the organic dye.

In the embodiment for recovery of organic dyes, particularly in dilute solutions as found in rinse waters, the process comprises first treating the dye-containing rinse water with a salt of a multivalent metal cation to insolubilize or precipitate the dye, followed by filtering or otherwise concentrating or collecting the insolubilized dye material for separation from the large volumes of water. Thereafter the insolubilized dye materal, as a precipitated salt or concentrate thereof, is dissolved in an aqueous acid solution such as in acidic dye bath solution and fed to the intermediate compartment of the above described dye purification process. This technique of insolubilizing the dye followed by separation of the insolubilized dye, e.g., precipitated dye salt, from unwanted materials such as large volumes of rinse water and dissolution of the recovered insolubilized dye in an acidic aqueous solution which is then electrolyzed to regenerate the dye, is applicable in the purification of dyes in their manufacture as well as to the purification of anodic oxygen or cathodic hydrogen sensitive organic materials such as organic metal complexes or chelates.

Any organic material that forms a substantially water insoluble salt with multivalent metal cations can be used in the instant process. The recovery process can be used for amino acids, unsaturated fatty acids, acids with unsaturated substituents such as vinyl and allyl groups, acids with oxygen-sensitive groups such as aldehyde, amino, hydroxyl, keto or ketene. Preferably the organic dyes are mordant or acid dyes containing sulfonic acid or carboxylic acid groups.

Any salt of a multivalent metal cation that insolubilizes an organic dye in an aqueous solution can be used in the instant process. Preferred salts are calcium hydroxide, or calcium carbonate and aluminum hydroxide.

EXAMPLE 4

An aqueous rinse solution containing about 100 ppm of a black mordant azo dye having the general formula 2-amino-4 nitrophenol→4,6,7-Trihydroxy-2-naphthalene sulfonic acid was treated with a solution of calcium hydroxide to effect insolubilization of the dye. About five (5) liters of a calcium hydroxide solution containing 8.5 grams of calcium hydroxide was mixed with about 200 gallons of rinse solution to effect insolubilization of the dye. The insolubilized dye was removed from the rinse solution by filtration (about 80 grams dry basis) and added to a dyebath solution being purified and restored electrodialytically as herein described. The insolubilized dye dissolved in the dye bath solution when calcium ions were removed from the dye bath to the catholyte solution. After treatment with calcium hydroxide, the rinse solution was essentially colorless.

EXAMPLE 5

A blue mordant azo dye having the general formula, 2 amino-5-nitro-P-cresol→chromatropic acid, was insolubilized in an aqueous solution containing about 1000 ppm of dye by adding 200 grams of solid calcium hydroxide (lime) to 200 gallons of dye solution. The insolubilized dye was filtered, rinsed with water, and converted to a soluble dye by electrodialytic removal of calcium ions. The solution dye was similar in dye properties to the original dye.

EXAMPLE 6

Five rinse solutions containing dyes furnished by Sandoz for coloring anodized aluminum were treated to insolubilize the dyes for removal from the rinse solution and to reform the soluble dye electrodialytically. Each rinse solution contained about 150 ppm of dye. The dyes were (Deep Black MLW-C.I. Mordant Black 75), (Fiery Red ML-C.I. Mordant Red 84), (Blue LLW-C.I. Mordant Blue 69), (Green GLW-C.I. Mordant Green 50) and (Black CL-C.I. Mordant Black 76). All dyes were insolubilized by the addition of calcium hydroxide, filtered from the solution and solubilized electrodialytically by removal of calcium ions. Solutions of the solubilized dyes were adjusted in pH and used to dye freshly anodized aluminum. The color and dye rate of each recovered dye was comparable to solutions of the corresponding new dye.

I claim:

1. An electrolytic process for purification of oxygen- or hydrogen-sensitive organic dyes which comprises applying an electrical potential to an aqueous acidic solution of said organic dye containing metal cations in an intermediate or feed compartment of an electrochemical cell having an anolyte compartment with an anode and an aqueous anolyte and a catholyte compartment with a cathode and an aqueous catholyte, said compartments being separated by cation permeable membranes, whereby said dye is separated from the anode and oxygen formed at the anode and the cathode and hydrogen formed at the cathode and metal cations are electrotransported from said feed compartment through said membrane into said catholyte compartment.

2. The process of claim 1 wherein said organic dye is an acid dye metal complex containing sulfonic or carboxylic acid groups.

3. An electrolytic process comprising an electrolytic cell having a feed compartment separated from an anolyte and a catholyte compartment by cation permeable membranes; said feed compartment containing an aqueous solution comprising a dyebath containing an oxygen sensitive organic dye and metal cations whereby when an electrical potential is applied across the cell the metal cations are electro-transported from said aqueous solution in the feed compartment through a cation permeable membrane into the catholyte without oxidation of the oxygen sensitive organic dye.

4. The process of claim 3, wherein the aqueous solution in the feed compartment is a dyebath comprising an organic dye for coloring anodized aluminum and aluminum or other metal cations.

5. An electrolytic process for purification of oxygen-sensitive organic materials in aqueous solution which comprises treating said solution with a salt of a multivalent metal cation to insolubilize said material, separating the insolubilized material from the resultant mixture, dissolving the separated insolubilized material in an acidic aqueous solution and applying an electrical potential to the resulting solution containing the dissolved material and multivalent metal cation in an intermediate or feed compartment of an electrochemical cell having an anolyte compartment with an anode and an anolyte and a catholyte compartment having a cathode and an aqueous catholyte, said compartments being separated by cation permeable membranes whereby said organic material is separated from the anode and oxygen formed at the anode and from the cathode and hydrogen formed at the cathode and said multivalent metal cations are electrotransported from said feed compartment through said membrane into said catholyte compartment.

6. The process of recovering dye material from rinse water in dyeing processes which comprises treating said rinse water with a salt of a multivalent metal cation to insolubilize said dye material, collecting said insolubilized dye material from the resulting mixtures, dissolving the collected insolubilized dye material in an aqueous acidic solution and purifying said dye material in said resulting solution containing metal cations by applying an electrical potential to said resulting solution in an intermediate or feed compartment of an electrochemical cell having an anolyte compartment with an anode and an aqueous anolyte and a catholyte compartment with a cathode and an aqueous catholyte, said compartments being separated by cation permeable membranes, whereby said dye material is separated from the anode and oxygen formed at the anode and the cathode and hydrogen formed at the cathode and metal cations are electrotransported from said feed compartment through said membrane into said catholyte compartment.

* * * * *